United States Patent [19]

Gardner

[11] Patent Number: 4,719,089

[45] Date of Patent: Jan. 12, 1988

[54] INTERNALLY COATED REACTION VESSEL FOR USE IN OLEFINIC POLYMERIZATION

[75] Inventor: Keith L. Gardner, Avon, Ohio

[73] Assignee: The B. F. Goodrich Company, Akron, Ohio

[21] Appl. No.: 8,492

[22] Filed: Jan. 29, 1987

Related U.S. Application Data

[62] Division of Ser. No. 648,925, Sep. 11, 1984, Pat. No. 4,659,791.

[51] Int. Cl.$^4$ ................................................ C08F 1/00
[52] U.S. Cl. .................................... 422/131; 422/241; 252/400.24
[58] Field of Search ............................. 422/131, 241; 252/400.24; 526/62

[56] References Cited

U.S. PATENT DOCUMENTS

| | | |
|---|---|---|
| 3,669,946 | 6/1972 | Koyanagi et al. |
| 3,691,080 | 9/1972 | Bauer et al. |
| 3,778,423 | 12/1973 | Reiter |
| 3,825,434 | 7/1974 | Berens et al. |
| 3,926,910 | 12/1975 | Mowdood |
| 4,024,301 | 5/1977 | Witenhafer et al. |
| 4,024,330 | 5/1977 | Morningstar et al. |
| 4,035,563 | 7/1977 | Tachibana et al. |
| 4,068,052 | 1/1978 | Weimer et al. |
| 4,080,173 | 3/1978 | Cohen |
| 4,081,248 | 3/1978 | Cohen |
| 4,098,972 | 7/1978 | Ogawa et al. |
| 4,182,808 | 1/1980 | Hong |
| 4,320,215 | 3/1982 | Yonezawa et al. |
| 4,420,591 | 12/1983 | Wempe et al. |

*Primary Examiner*—Sam Silverberg
*Attorney, Agent, or Firm*—Joe A. Powell; Alan A. Csontos

[57] ABSTRACT

A method of preventing or retarding polymer build-up on the internal surfaces of polymerization reactors is provided by this invention. Reduced build-up in vinyl chloride polymerization is obtained by having a phenolic compound coated on the internal surfaces of the reactor vessel and a water phase polymerization inhibitor either combined with the phenolic coating or added to the aqueous polymerization medium. Optionally, a chelating agent is also added with the water phase inhibitor. The process is further enhanced by the presence of water soluble dispersants such as polyvinyl alcohol and methyl cellulose.

11 Claims, No Drawings

INTERNALLY COATED REACTION VESSEL FOR USE IN OLEFINIC POLYMERIZATION

This is a division of application Ser. No. 06/648,925, filed Sept. 11, 1984, now U.S. Pat. No. 4,659,791.

BACKGROUND OF THE INVENTION

Various type chemical processes are commonly carried out in large, stirred vessels which are frequently provided with auxiliary equipment, such as baffles, condensers, agitators, heat transfer coils which enable heat to be supplied or extracted from the contents of the vessels, and the like. In many cases, however, such processes eventually produce undesirable deposits on the surfaces of the equipment with which the reaction mixtures come into contact including the interior walls of the vessel. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "buildup", of solid polymer on reactor surfaces, not only interfers with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable monoolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer buildup must be removed since it results in further formation of polymer buildup which in turn results in a crust that adversely affects heat transfer and contaminates the polymer being produced.

Various coatings for reactors have been proposed and several of these have found wide commercial acceptance. The reactor coatings currently used in the polyvinyl chloride industry are primarily phenolic materials such as self condensed phenols or phenols condensed with other materials such as aldehydes or amines. These coatings have proved to be a very significant advancement over the previous methods where no coatings were used. However, experience with such coatings on a commercial scale has shown that more dilute coating solutions would be desirable in order to reduce costs and more importantly to reduce the color of said coating solutions. These prior art coatings are dark colored solutions and as such have a tendency to discolor polymers formed during polymerization. Efforts are continuously being made to find an even more effective reactor coating.

U.S. Pat. No. 4,035,563 teaches using in the aqueous reaction medium salts of nitrous acids such as sodium nitrite together with polyvalent metal salts as a system to reduce "build-up" on the walls of the reactor in a vinyl chloride polymerization. U.S. Pat. No. 4,080,173 teaches using self condensation products of resorcinol as a reactor coating to prevent polymer buildup.

SUMMARY OF THE INVENTION

It has been found that very low polymer buildup occurs on the internal surface of a polymerization reactor when a water phase polymerization inhibitor and optionally a chelating agent is used in conjunction with a phenolic reactor coating. The inhibitor may be applied to the wall of the reactor with the phenolic coating or added to the aqueous polymerization medium. The combined effect of the water phase polymerization inhibitor and the phenolic coating allows a very low amount of the dark colored phenolic material to be used and thus is a very desirable coating. The process of this invention is further enhanced by the use of water soluble dispersants such as polyvinyl alcohol and methyl cellulose.

DETAILED DESCRIPTION

Phenolic compounds suitable for use in this invention are those that are self condensed or co-condensation products of phenols such as the self condensation or co-condensation product of phenol, resorcinol, hydroquinone, hydroxy hydroquinone, catechol, phloroglucinol and pyrogallol. Polyhydric naphthols such as 2,7-dihydroxy naphthalene, 3,7-dihydroxy naphthalene, 2,6-dihydroxy naphthalene, and the like may also be self condensed or co-condensed to make suitable phenolic compounds for use in this invention. Phenols such as those mentioned above may also be condensed with other materials such as amines. Suitable amines would include p-phenylenediamine and m-phenylenediamine that could be condensed with the phenols to give phenolic compounds suitable for use in this invention. Aromatic or aliphatic aldehydes such as benzaldehyde and formaldehyde may be condensed with phenols to give phenolic compounds suitable for use in this invention. For example, the condensation product of pyrogallol condensed with benzaldehyde is a suitable phenolic compound for use in this invention.

When these phenols are self condensed, or condensed with another phenol or with amines or aldehydes, there is more than one compound formed. Oligomers having different molecular weights are formed as well as oligomers having a different linkage. For example self condensed resorcinol gives both poly(oxyphenylene) and poly(hydroxyphenylene) products.

The molecular weight of the phenolic compound is not limiting, however a preferred molecular weight would range from about 94 to about 3,000.

The phenol compounds may be substituted with aliphatic, aromatic, halogen or other groups which do not replace all of the —OH groups.

Monomeric phenols also are suitable as the phenolic compounds of this invention. Examples of monomeric phenols are phenol, resorcinol, hydroquinone, hydroxy hydroquinone, catechol, phloroglucinol, pyrogallol and each of the above with substituents attached thereto such as aliphatic, aromatic or halogen groups. One or a mixture of two or more monomeric phenols may be used as the phenolic compounds of this invention.

The important criteria is that the phenolic compound for use in this invention have a functional phenolic (—OH) group and an aromatic backbone.

One phenolic compound or a mixture of two or more phenolic compounds may be used together to form the phenolic compound of this invention.

The method of preparing condensed phenolic compounds is well known by those skilled in the art and is a relatively simple reaction. For example, self condensed resorcinol can be prepared by heating or cooking resorcinol in a reaction vessel under a nitrogen atmosphere for 8 hours a 300° C. without catalyst or for about 25 minutes at 300° C. by using a 25% molar NaOH catalyst. The condensation product of pyrogallol and benzaldehyde may be prepared by cooking in the presence of a mineral acid catalyst for 2 to 4 hours at 100° to 120° C.

The condensed phenolic compounds may be put into solution by dissolving in a weak caustic solution such as NaOH or NH$_4$OH or an organic solvent such as methanol may be used. The aqueous solution is preferred.

This solution of condensed phenolic compounds is applied to the internal surfaces of the reactor vessel. The preferred method of application is by spraying. However, brushing, or by filling the reactor with water and thereby leaving a tightly adhering coating or film of the phenolic compound on the internal surfaces of the reactor is a satisfactory method.

The phenolic coating may be very thin such as only a monolayer thick or a heavy coating. A thin coating may be obtained by spraying the phenolic compound on the interior surfaces of the reactor and then rinsing the surfaces with water. A thick coating is best obtained by using an organic solvent such as methanol and applying multiple coats. Thin coatings are preferred in this invention.

Water phase polymerization inhibitors suitable for use in this invention are the inorganic and organic salts of nitrous acid, organic and inorganic phosphites and low molecular weight phenolics such as phenol. Examples of suitable inorganic salts of nitrous acid are sodium nitrite, potassium nitrite, and calcium nitrite. Examples of suitable organic salts of nitrous acid are n-pentyl nitrite, n-butyl nitrite, tris(2-ethylhexyl)nitrite, dicylohexyl amine nitrous acid salt, and triethyl amine nitrous acid salt. Examples of suitable organic phosphites are t-butyl phosphite and as suitable inorganic phosphites are the sodium and potassium phosphites. Suitable phenolics that will act as water phase polymerization inhibitors are the low molecular weight water soluble phenolics such as phenol. One water phase polymerization inhibitor may be used or a mixture of two or more may be used in this invention.

The level of water phase polymerization inhibitor used in this invention is from about 0.01 to about 200 ppm based on the weight of the aqueous reaction medium, preferably from about 1.0 to about 50 ppm, more preferably from about 5.0 to about 20.0 ppm. When a high level of water phase polymerization inhibitor is used the reaction rate can be adversely affected and if too much is used the polymerization reaction will be completely stopped. Low molecular weight water phase inhibitors such as sodium nitrite require less weight concentration than do the higher molecular weight organic nitrites.

The water phase polymerization inhibitor may be added to the aqueous reaction medium, preferably at the time of the initial charging of the reaction ingredients or the water phase polymerization inhibitor may be added to the phenolic coating solution prior to application to the vessel's internal surfaces. The water phase inhibitor may also be sprayed or coated directly on the phenolic coating prior to charging the reactor.

Optionally, a chelating agent may be used in this invention. Chelating agents suitable for use in this invention are the polyvalent metallic salts such as sulphates, nitrates, sulphites, phosphates and halogen acid salts of various polyvalent metals. Although metals having a valence of 2 will work, it is preferred to use metals with a valence of at least 3. Examples of suitable chelating agents are calcium chloride, aluminum sulfate, magnesium chloride, titanium trichloride, stannic chloride, ferric chloride, alums and ferrous nitrate.

The level of chelating agents that may be used in this invention is from 0 to about 2,000 parts per million (ppm), preferably from about 5 to about 500 ppm, more preferably from about 10 to about 50 ppm, based on the weight of the aqueous reaction medium. A level above this maximum level would not be inoperable but would serve no useful purpose.

The chelating agent may be added to the aqueous reaction medium along with the water phase polymerization inhibitor or added to the phenolic coating prior to application on the vessel's internal surfaces or applied to the phenolic coating prior to charging the polymerization reaction ingredients.

Although not critical to the operation of this invention, it has been found that the reduction in reactor buildup is further enhanced by having a water soluble dispersant in the reaction medium. Dispersants found to be desirable are the polyvinyl alcohols and cellulose derived dispersants such as hydroxy propyl methyl cellulose. These dispersants are believed to go out of solution and attach by adsorption to the coating on the reactor vessel's internal surfaces and thereby aid in the prevention of reactor build-up.

While the present invention is specifically illustrated with regard to the suspension polymerization of vinyl chloride, it is to be understood that the apparatus and process may likewise be applied in the dispersion, emulsion, or suspension polymerization of any polymerizable ethylenically unsaturated monomer or monomers where undesireable polymer buildup occurs. Examples of such monomers are other vinyl halides and vinylidene halides, such as vinyl bromide, vinylidene chloride, etc., vinylidene monomers having at least one terminal CH$_2$=C< grouping, such as esters of acrylic acid, for example methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any types of monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal CH$_2$=C< grouping, copolymerizable therewith in amounts as great as about 80% or more by weight, based on the weight of the monomer mixture, since polymer buildup in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixtures.

Further, the polymerization process may be carried out utilizing a full reactor technique. That is, the reaction vessel is completely filled with the polymerization medium and kept that way throughout the reaction by constant addition thereto of water or additional makeup liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

In order to rate the various coatings, as particularly set forth in the specific examples which follow hereinafter, there has been devised a rating scale with respect to paper and sandy buildup. An uncoated reactor, referred to as the control, where normal amounts of both types of buildup occur, is given a rating of 1.5. Any rating below 1.0 is good or a definite improvement. In other words, 0.0 rating is perfect, and so on.

In order to further illustrate the present invention, the following specific examples are given. It is to be understood, however, that this is merely intended in an illustrative and not limitative sense. In the examples, all parts and percents are by weight unless otherwise indicated.

EXAMPLES

In the following Examples the polymerization recipe used is as follows:

| | |
|---|---|
| Vinyl Chloride | 1000 grams |
| Water (demineralized) | 2055 grams |
| 88% hydrolyzed polyvinyl acetate | 0.5 gram |
| di-secondary butyl peroxydicarbonate | 0.5 cc. |

All reactions are run in a 3 liter reactor equipped with agitation. The reactor is thoroughly cleaned before each polymerization run. A full reactor is used in the polymerizations, sufficient water being added to keep the reactor full. The temperature is maintained at 57° C. and the reaction medium is agitated. The water is added during the reaction as the mixture shrinks because of formation of polymer. After 200 minutes of time, the reaction is discontinued. The contents of the reactor is removed and the internal surfaces are rinsed with water. The internal surfaces of the reactor are then classified in accordance with the aforementioned procedure for rating said surfaces.

This example is presented to show the effectiveness of this invention in reducing polymer buildup where the water phase polymerization inhibitor is used along with the phenolic coating. The above procedure is followed for the test runs (1 through 18) shown in Table I.

TABLE I

| Run # | Phenolic Coating | Water Phase Inhibitor | Chelating Agent | Build-Up Rating | |
|---|---|---|---|---|---|
| | | | | Sand | Paper |
| 1 (control) | None | None | None | 1.5 | 1.5 |
| 2 | Self condensed resorcinol | Phenol 5 ppm | None | 0.8 | 1.0 |
| 3 | Self condensed resorcinol | Phenol 5 ppm | Aluminum[1] 10 ppm | 1.0 | 0.3 |
| 4 | Self condensed resorcinol | Phenol 10 ppm | Aluminum 10 ppm | 0.6 | 0.5 |
| 5 | Self condensed resorcinol | Sodium Nitrite 1 ppm | None | 0.3 | 0.5 |
| 6 | Self condensed resorcinol | Sodium Nitrite 10 ppm | Magnesium[2] 10 ppm | 0.1 | 0.3 |
| 7 | Self condensed resorcinol | Sodium Nitrite 20 ppm | Magnesium 20 ppm | 0.1 | 0.2 |
| 8 | Self condensed resorcinol | Sodium Nitrite 100 ppm | Magnesium 20 ppm | 0 | 0.1 |
| 9 | Self condensed resorcinol | Sodium Nitrite 200 ppm | Magnesium 20 ppm | 0 | 0 |
| 10 | Self condensed resorcinol | n butyl nitrite 50 ppm | None | 0.2 | 0.2 |
| 11 | Self condensed resorcinol | n butyl nitrite 50 ppm | Aluminum 10 ppm | 0.2 | 0.1 |
| 12 | Self condensed resorcinol | n pentyl nitrite 50 ppm | None | 0.1 | 0.2 |
| 13 | Self condensed resorcinol | n pentyl nitrite 50 ppm | Aluminum 10 ppm | 0.1 | 0.1 |
| 14 | Self condensed resorcinol | t butyl phosphite 10 ppm | None | 0.1 | 0.5 |
| 15 | Self condensed resorcinol | t butyl phosphite 10 ppm | Calcium[3] 10 ppm | 0.2 | 0.3 |
| 16 | Self condensed | tris(2-ethyl hexyl | None | 0.3 | 0.5 |

TABLE I-continued

| Run # | Phenolic Coating | Water Phase Inhibitor | Chelating Agent | Build-Up Rating | |
|---|---|---|---|---|---|
| | | | | Sand | Paper |
| 17 | Self condensed resorcinol | resorcinol phosphite) 50 ppm tris(2-ethyl hexyl phosphite) 50 ppm | Calcium 10 ppm | 0.2 | 0.3 |
| 18 | Self condensed resorcinol phenol | phenol 10 ppm | None | 0.6 | 0.3 |

[1] Aluminum present as aluminum sulfate
[2] Magnesium present as magnesium chloride
[3] Calcium present as calcium chloride From the example (Run 1) it can be seen that no coating gives very bad build-up (1.5 rating). Runs 2, 5, 10, 12, 14, 16 and 18 show that the phenolic coating combined with the presence of a water phase polymerization inhibitor offers significant reduction in undesireable polymer build-up. Runs 3, 6, 11, 13 15 and 17 show that paper type build-up is further reduced by the presence of a chelating agent.

Run No. 18 is presented to show that the water phase polymerization inhibitor may be added to the phenolic coating solution and the phenolic coating solution coated on the reactor's internal surfaces prior to charging the reaction ingredients.

The above examples and description of the invention is not limited by the specific materials mentioned or examples performed. The invention is intended to be limited only by the claims which follow.

I claim:

1. A polymerization reaction vessel having on the internal surfaces thereof a coating comprised of: (a) at least one phenolic compound selected from the group consisting of self condensed phenols condensed with amines, phenols condensed with aromatic aldehydes and phenols condensed with aliphatic aldehydes; (b) at least one water phase polymerization inhibitor selected from the group consisting of nitrites and phosphites; and (c) at least one chelating agent selected from the group of salts consisting of aluminum and magnesium.

2. A polymerization reaction vessel as defined in claim 1 wherein a dispersant is adsorbed on the surface of said coating.

3. A vessel as defined in claim 2 wherein said dispersant is polyvinyl alcohol.

4. A vessel as defined in claim 2 wherein said dispersant is a cellulose derived dispersant.

5. A composition comprising: (a) at least one phenolic compound selected from the group consisting of self condensed phenols, phenols condensed with amines, phenols condensed with aromatic aldehydes and phenols condensed with aliphatic aldehydes; (b) at least one water phase polymerization inhibitor selected from the group consisting of nitrites and phosphites; and (c) at least one chelating agent selected from the group of salts consisting of aluminum and magnesium.

6. A composition of claim 5 wherein said water phase polymerization inhibitor is selected from the group consisting of sodium nitrite, potassium nitrite, n-phenyl nitrite, n-butyl nitrite and tris(2-ethyl hexyl)nitrite.

7. A composition of claim 6 wherein said water phase polymerization inhibitor is n-butyl nitrite.

8. A composition of claim 5 wherein said phenolic compound is self condensed resorcinol.

9. A composition of claim 5 comprising self condensed resorcinol, sodium nitrite and magnesium chloride.

10. A composition of claim 5 comprising condensation product of benzaldehyde and pyrogallol, sodium nitrite and aluminum sulfate.

11. A composition of claim 5 wherein said water phase polymerization inhibitor is an organic nitrite.

* * * * *